United States Patent [19]

Hehl

[11] Patent Number: 4,710,121

[45] Date of Patent: Dec. 1, 1987

[54] INJECTION MOLD CHANGING UNIT

[76] Inventor: Karl Hehl, Arthur-Hehl-Strasse 32, D-7298 Lossburg 1, Fed. Rep. of Germany

[21] Appl. No.: 840,457

[22] Filed: Mar. 17, 1986

[30] Foreign Application Priority Data

Mar. 16, 1985 [DE] Fed. Rep. of Germany ....... 3509518

[51] Int. Cl.$^4$ ............................................. B29C 45/26
[52] U.S. Cl. ..................................... 425/190; 425/195; 425/547; 425/575; 425/359; 425/411; 425/450.1
[58] Field of Search .................. 425/190, 192 R, 193, 425/450.1, 451, 195, 542, 547, 569, 575, 581, 411, 451, 453, 451.9, 359; 100/918

[56] References Cited

U.S. PATENT DOCUMENTS

| | | | |
|---|---|---|---|
| 3,818,748 | 6/1974 | Smit | 100/918 |
| 4,005,964 | 2/1977 | Bishop | 425/190 |
| 4,099,901 | 7/1978 | Shuman | 425/193 |
| 4,105,385 | 8/1978 | Hehl | 425/450.1 |
| 4,303,008 | 12/1981 | Hice et al. | 425/547 |
| 4,408,521 | 10/1983 | Schelli et al. | 100/918 |
| 4,421,469 | 12/1983 | Egger et al. | 425/190 |
| 4,425,091 | 1/1984 | Prince | 425/595 |
| 4,433,620 | 2/1984 | Kiyosawa | 100/918 |
| 4,472,127 | 9/1984 | Cyriax et al. | 425/542 |
| 4,500,274 | 2/1985 | Cyriax et al. | 425/542 |
| 4,518,338 | 5/1985 | Hehl | 425/183 |
| 4,529,371 | 7/1985 | Nickley | 425/542 |
| 4,555,228 | 11/1985 | Nishiike et al. | 425/192 R |

FOREIGN PATENT DOCUMENTS

69221 1/1983 European Pat. Off. .
3228434 3/1983 Fed. Rep. of Germany .

*Primary Examiner*—Willard E. Hoag
*Attorney, Agent, or Firm*—Spencer & Frank

[57] ABSTRACT

A mold closing unit for an injection molding machine has an exchangeable injection mold assembly; a mold exchanging device; a conditioning table situated adjacent a clamping space of the mold closing unit; and a supply line coupling for connecting to and disconnecting from, one another conduit terminals of mold-side supply conduits and machine-side supply conduits. The supply line coupling is formed of a mold-side coupling half fixedly attached to the mold body and a machine-side coupling half arranged to be movable between the conditioning table and the clamping space. The mold-side coupling half and the machine-side coupling half are joinable to and disconnectable from, one another along a horizontal parting plane of the supply line coupling for joining the machine-side and mold-side conduits to one another for preheating the injection mold assembly on the conditioning table. There is further provided a coupling drive mounted on the machine-side coupling half for performing coupling strokes of the supply line coupling. Vertically oriented coupling pins guide the machine-side coupling half and are arranged to alternatingly engage behind a holding element of the conditioning table and the mold-side coupling half dependent on a conveying motion of the injection mold assembly.

16 Claims, 12 Drawing Figures

INJECTION MOLD CHANGING UNIT

BACKGROUND OF THE INVENTION

This invention relates to a mold closing unit which forms part of an injection molding machine and which has a mold changing device, a conditioning table as well as a supply line coupling which includes coupling halves that may be separated and joined along a horizontal parting plane for coupling flexible supply conduits of an injection mold assembly to supply conduits at the machine side of the form closing unit for the purpose of preheating (conditioning) the injection mold on the conditioning table from which the injection mold assembly—without removal of the supply conduits—may be conveyed horizontally and perpendicularly to the closing device of the form closing unit into its working position in the mold clamping chamber of the mold closing unit. The mold-side coupling half is affixed to the mold body in front of the rear end face thereof. The rear end face is oriented away from the clamping space of the mold closing unit, and the mold body of the injection mold assembly is bounded by back plates. The machine-side coupling half is movably arranged between the conditioning table and the mold clamping space.

By "conditioning" there is meant the thermal adaptation of the injection mold assembly to the intended operational conditions. Such conditioning is performed externally of the working position and, as a rule, it occurs during the injection molding operation performed with another injection mold assembly.

According to a known mold closing unit with associated injection mold changing device, disclosed, for example, in German Pat. No. 3,323,353, to which corresponds U.S. Pat. No. 4,518,338, the supply line coupling is designed for an injection mold assembly which is placed onto the conditioning table by lowering in a vertically downward direction. The vertical positioning motion is utilized for the mutual approach motion of the coupling heads or coupling halves to achieve mutual contacting thereof and is thus also instrumental for coupling the supply conduits. The machine-side coupling head is connected with the conditioning table by means of a coupling rod which is displaceably supported in a guide of the conditioning table and which is moved with the injection mold assembly into the clamping space of the mold closing unit. The mold-side coupling head is connected by means of a connecting piece with the injection mold assembly standing on the conditioning table such that the mold-side coupling head remains at all times in the same spatial relationship relative to the conditioning table. In case of mold bodies of different dimensions, this unchanging relationship is achieved by using a connecting member of complemental dimensions. This ensures that during the vertical setting motion of the injection mold assembly, the line terminal couplings of both coupling heads are at all times in alignment (flush) with one another in the vertical direction.

It is further known, as disclosed, for example, in German Offenlegungsschrift (Non-examined Published patent application) No. 2,332,205, or European patent application No. 92,868 to provide injection mold assemblies with back plates which project frontally beyond both sides of the rectangular mold body.

SUMMARY OF THE INVENTION

It is an object of the invention to provide an improved mold closing unit with an associated mold changing device of the above-outlined type which, with insubstantial technological input, achieves the structural conditions required for an automatic coupling of the supply lines (controlled by the computer of the injection molding machine) at the time the injection mold assembly is displaced onto the conditioning table horizontally and transversely to the closing direction of the mold closing unit.

This object and others to become apparent as the specification progresses, are accomplished by the invention, according to which, briefly stated, the machine-side coupling half situated above the injection mold assembly is equipped with a coupling drive for executing the coupling stroke of the supplY line coupling and is guided, during the performance of the coupling stroke, along vertical coupling pins which alternatingly engage behind a holding element of the conditioning table and the mold-side coupling half as a function of the conveying motion of the injection mold assembly.

The invention as outlined above has the additional advantage that the lower entrance to the mold clamping space of the mold closing unit is no longer encumbered by a coupling bar guide support conventionally mounted on an adjoining mold carrier. This arrangement facilitates the installation of special equipment. During the conveyance of the injection mold assembly from the conditioning table in the mold clamping space and during the injection molding process proper, that is, as the injection mold assembly is situated in its working position, the machine-side coupling half is carried exclusively by the mold-side coupling half so that during the conveyance and during the injection molding process, no further holding mechanisms are required for the machine-side coupling half.

German Offenlegungsschrift No. 3,228,434 and European patent No. 69,221 disclose a mold closing unit with a mold changing device, a preheating station and supply line couplings to couple flexible supply conduits of an injection mold assembly to the machine-side supply conduits. The machine-side coupling half is provided with a coupling drive that comprises a piston-and-cylinder unit. The machine-side coupling half, however, cannot be moved between the preheating station and the mold closing unit: with the preheating station and the mold closing unit there are associated immovably supported coupling halves.

DESCRIPTION OF THE PREFERRED EMBODIMENTS

Figure 1:
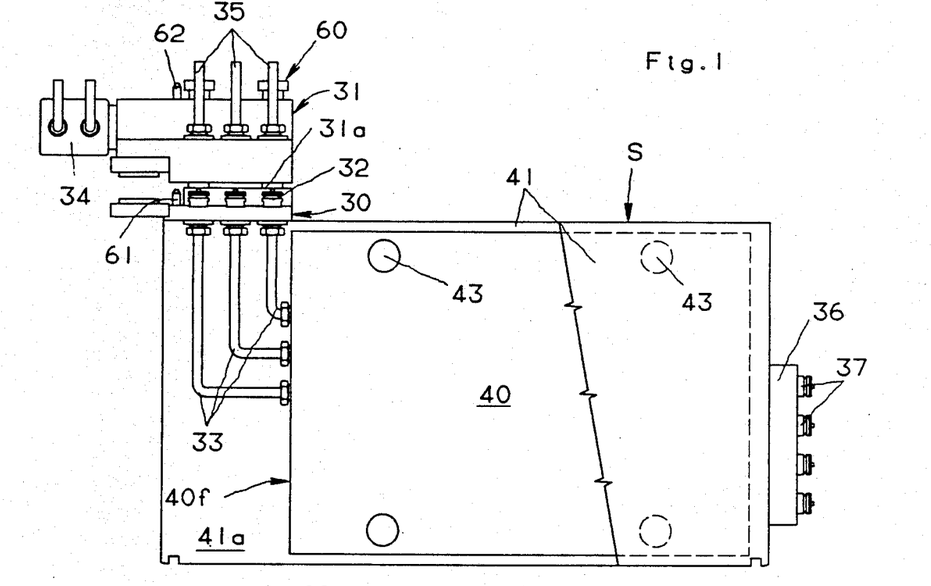
FIGS. 1 and 2 are elevational views of an injection mold assembly of a preferred embodiment of the invention before and, respectively, after a coupling stroke is performed.
Figure 2:
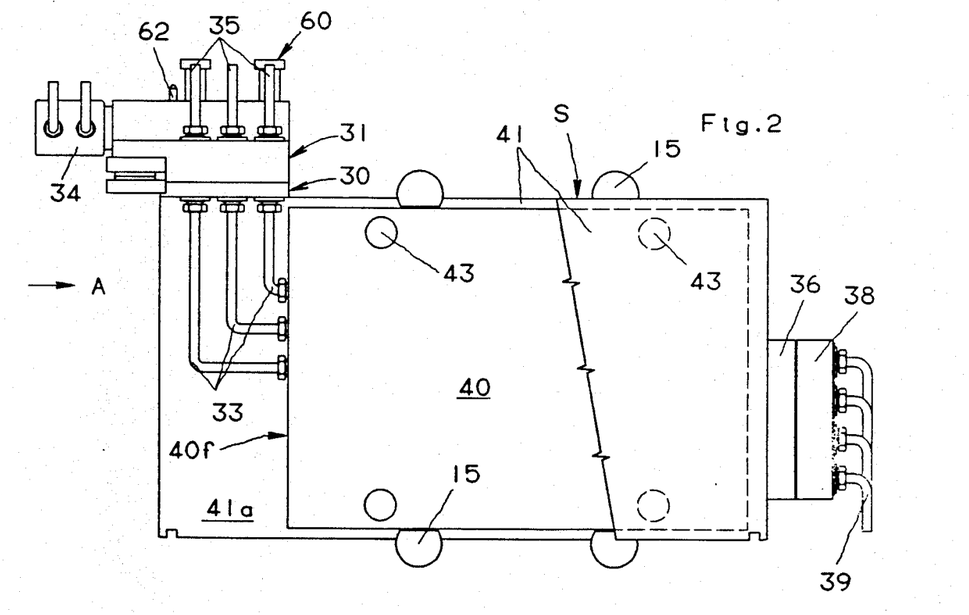
Figure 3:
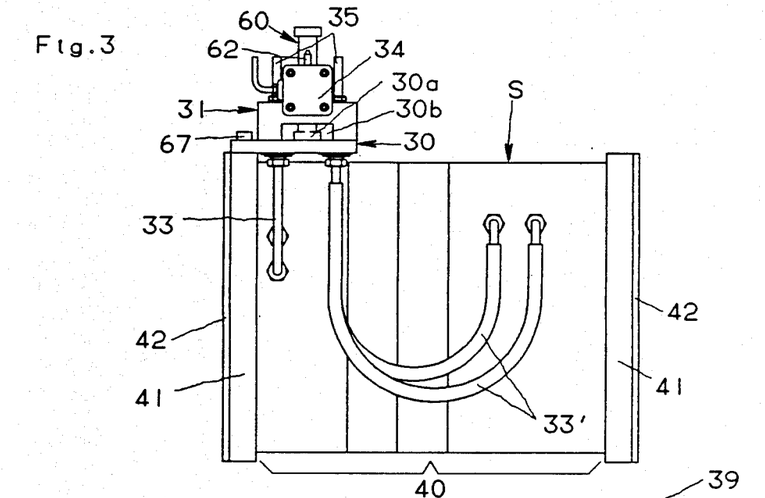
FIG. 3 is an end elevational view of the construction shown in FIG. 2, as viewed in the direction of the arrow A shown therein.
Figure 4:
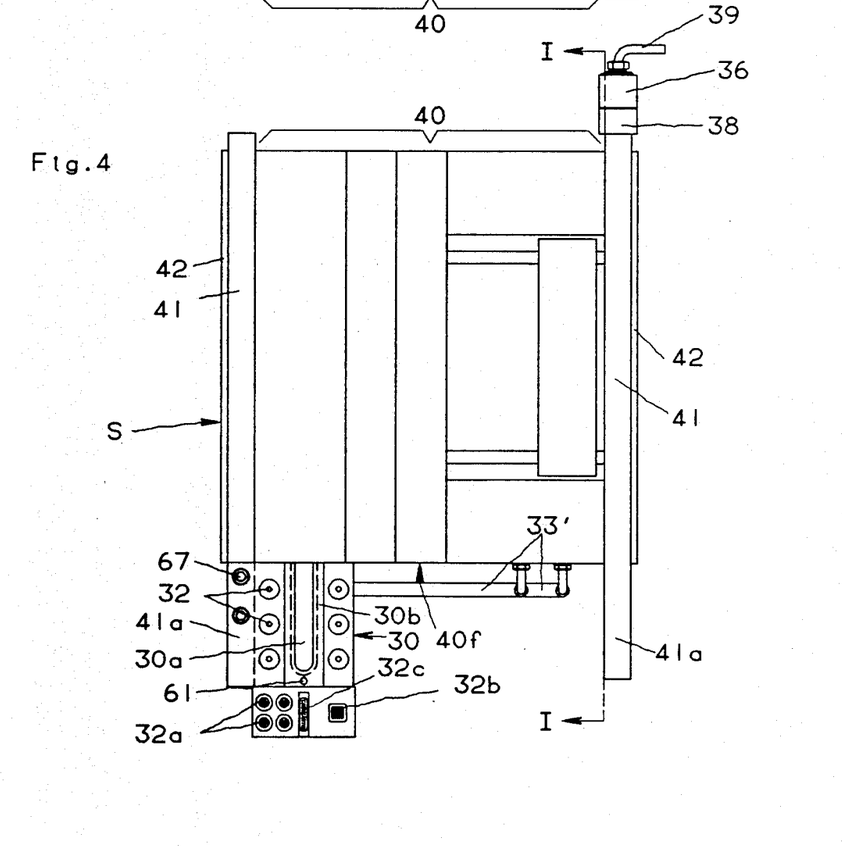
FIG. 4 is a top plan view of the injection mold assembly, shown without a machine-side coupling half.
Figure 6:
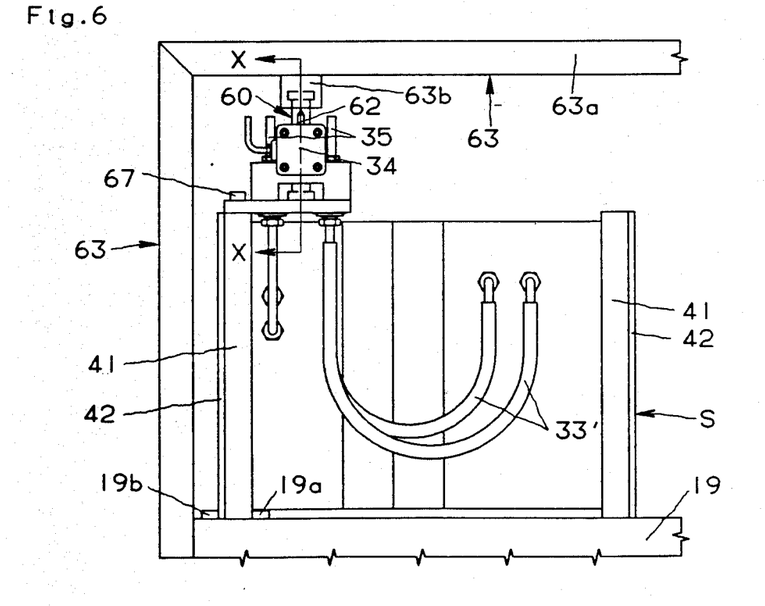
Figure 7:
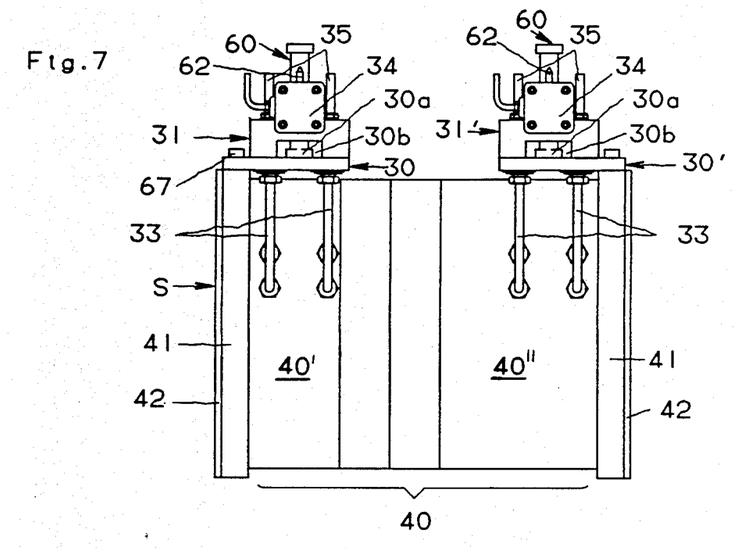
FIGS. 7 and 8 are elevational views, similar to FIGS. 3 and 4, of another preferred embodiment of the invention.
Figure 8:
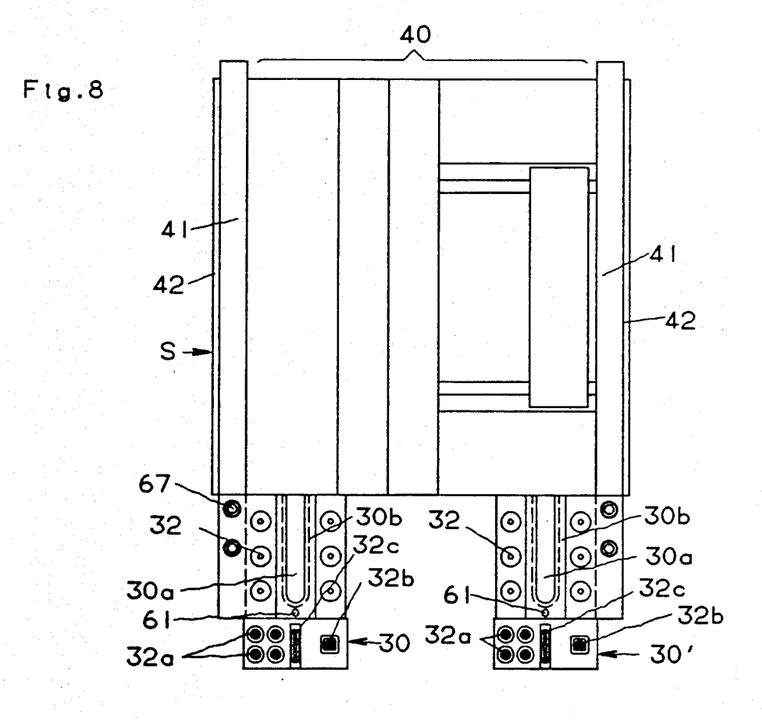

Turning first to FIGS. 1 and 2, the injection mold assembly S equipped with the mold-side coupling half 30 and the associated automatic mold exchanging device of the form closing unit are functionally adapted to one another. The coupling device which comprises the mold-side coupling half 30 and a machine-side coupling half 31 serves for the automatic coupling of flexible supply conduits for the injection process and for the preheating (conditioning) of the injection mold assembly S to operational temperatures on a conditioning table 19. It is a characteristic of the automatic mold exchanging device according to the invention that the injection mold assembly S, without disconnecting the machine-side supply conduits 35 (leading to and from the temperature-conditioning equipment) from the conditioning table 19 (FIGS. 5 and 6), may be conveyed horizontally and perpendicularly to the closing direction into the working position in the mold clamping space and conversely. The mold-side coupling half 30 or, as shown in FIGS. 7 and 8, the mold-side coupling halves 30, 30' secured to the injection mold assembly S is situated in front of the rear end side 40f of the mold body 40 forming part of the injection mold assembly S and bounded by back plates 41. The cooperating machine-side coupling half 31 (FIGS. 1, 2) or 31' (FIGS. 7, 8) which is periodically connected with the conditioning table 19 is situated above the injection mold assembly S and is equipped with a coupling drive constituted by a piston-and-cylinder unit 34 to cause execution of the coupling stroke of the supply line coupling.

Figure 5:
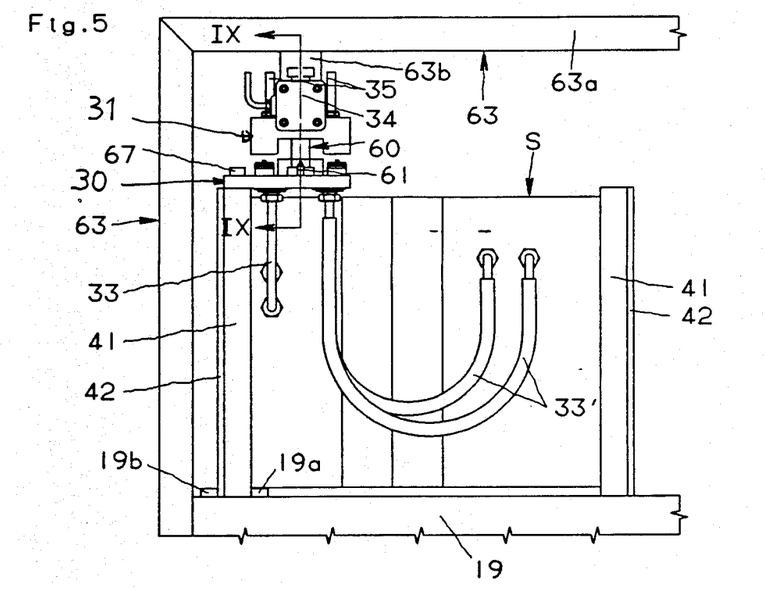
FIGS. 5 and 6 are side elevational views of an injection mold assembly situated on a conditioning table, illustrated before and after performing the coupling stroke, and viewed similarly to FIG. 3.

The machine-side coupling half 31 or 31' is guided along vertical coupling pins 60 during the coupling stroke. The coupling pins 60 alternatingly engage behind a holding element 63b of the conditioning table 19 and the mold-side coupling half 30 or 30', dependent upon the conveying motion of the injection mold assembly S when the latter is conveyed onto the conditioning table 19 alternatingly from opposite directions. The coupling pins 60 which project on either side of the table-side coupling half 31 have cylindrical coupling heads 60b, 60a as may be particularly well observed in FIGS. 9-12. During the conveying motion of the injection mold assembly S, the upper coupling heads 60b may be introduced into a corresponding T-groove 63c of the holding element 63b of the conditioning table 19, and the lower coupling heads 60a may be introduced into a T-groove 30a of the mold-side coupling half 30. The coupling pins 60 and the cooperating T-grooves 30a, 63c are situated symmetrically to a vertical symmetry plane s-s of the coupling halves 30, 31 or 30', 31'. The holding element 63b provided with the T-groove 63c is secured to a horizontal carrier beam 63a of a bridge 63 of the conditioning table 19, as shown in FIGS. 5 and 6. The lower T-groove 30a is provided in a T-groove rib 30b of the mold-side coupling half 30 or 30'. The T-groove rib 30b is flanked on both sides by serially arranged line terminals 32, 32' of the coupling halves 30, 31'. The conditioning connecting lines 33 connect the mold half, securable to the stationary mold carrier of the mold closing unit, with the mold-side coupling half 30. The conditioning connecting lines 33' connect the mold half, securable to the movable mold carrier, with the mold-side coupling half 30. As may be observed particularly in FIGS. 11 and 12, the step-like positive engagement profile of the mold-side coupling half 30 corresponds to a complemental negative engagement profile of the body 31a of the machine-side coupling half 31.

The coupling unit formed of the coupling halves 30, 31 and, respectively, 30', 31' of a supply line coupling is secured to the upper edge of a back plate 41 by means of screws 67 and is flush with the rear end face 40f of the mold body 40 and with the outer face of the back plate 41 on which the coupling unit is received. As may be observed in FIGS. 5 and 6, the injection mold assembly S is guided on its conveying path from the conditioning table 19 into the clamping space along guide strips 19a, 19b. The latter lie in that zone of a back plate 41 which projects downwardly below the mold body 40 and engages the back plate 41 with the intermediary of an insulating plate 42 of the back plate 41. The insulating plate 42 is secured to the mold body 40 by centering pins 43.

Referring now in particular to FIGS. 9-12, the coupling drive is constituted by a hydraulic piston- and-cylinder unit 34 whose horizontal stroke is converted into a vertical coupling stroke by means of a cam mechanism. The latter comprises two parallel strips 65 which are connected with the piston rod 34c of the piston 34b of the piston-and-cylinder unit 34 by means of a coupling pin 64. The planar inner sides of the control strips 65 engage diametrally opposite, flattened portions 60d of the coupling pins 60 which are situated at all times at the same distance above the conveying path of the injection mold assembly S. The outer faces of the control strips 65 engage inner guide faces of the body 31a of the machine-side coupling half 31. Both control strips 65 are provided with congruent cam tracks 65a into which project diametrally opposite follower pins 60c of adjoining coupling pins 60.

Figure 9:
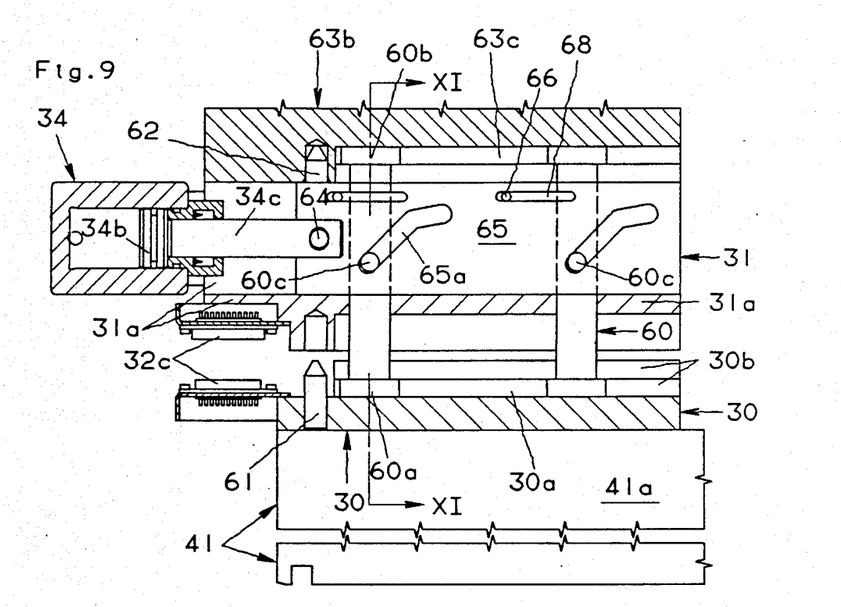
FIGS. 9 and 10 are sectional elevational views of components of the structure shown in FIGS. 1 and 2, in the zone of vertically sectioned coupling halves at an enlarged scale.
Figure 10:
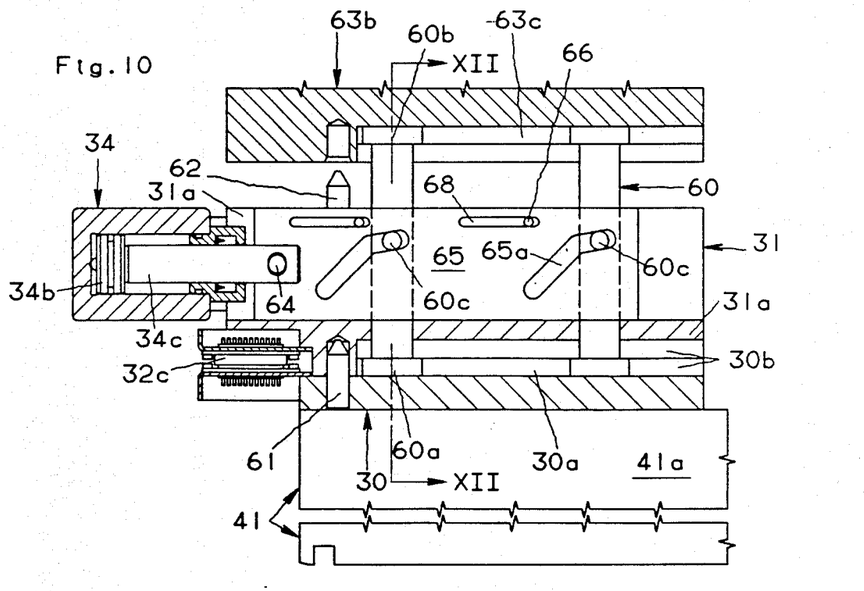

Thus, in coupling situations shown in FIGS. 9, 10 each coupling pin 60 is supported in a vertical direction by the holding element 63b and the mold-side coupling half 30. In a horizontal direction the pins 60 are supported either on the ends of the control strips 65 (FIG. 9) or on the body 31a which is fixed on the coupling half 30 by the centering pins 61.

During the coupling stroke of the piston-and-cylinder unit 34 supported by the body 31a, the piston 34b pulls, by means of its piston rod 34c the control strips 65 from a position shown in FIG. 9 into a position shown in FIG. 10. At the same time, the control strips 65 glide with their lower edges on horizontal shoulders 31b on the body 31a. Guide pins 66 of the body 31a project into horizontal slots 68 of the body 31a of the machine-side coupling half 31. The guide pins 66 ensure that no relative motion occurs in a vertical direction between the control strips 65 and the body 31a. In the course of the displacement of the control strips 65 from the position shown in FIG. 9 into the position shown in FIG. 10, the stationary cam follower pins 60c of the coupling pins 60 positively cause the vertical coupling stroke of the entire machine-side coupling half 31 by virtue of the camming effect of the cam tracks 65a. During the coupling stroke the control strips 65 are guided along the diametral flattened portions 60d of the coupling pins 60 and on the inner guide faces of the body 31a as well as on the guide pins 66.

During the coupling stroke, the centering pins 61 of the mold-side coupling halves 30 or 30' project into corresponding central bores of the machine-side coupling head 30 or 31' for an accurate centering. At the same time, during the performance of the coupling stroke at least one centering pin 62 of the machine-side coupling half 31 or 31' is freed from the centering opening of the holding element 63b.

The coupling halves 30, 31 or 30', 31' have, in a rearwardly projecting zone 41a of the back plate 41, cooperating sensor terminals 32a, electric terminals 32b as well as a coding 32c. At the frontal terminal edge of that back plate 41 which is in engagement with the movable mold carrier when the injection mold assembly S is in the working position, there is provided a coupling body 36 with coupling terminals 37 which cooperate with coupling terminals of a stationary coupling body 38. Lines 39 may be connected by means of the coupling bodies 36 and 38 to the injection mold assembly S. The lines 39 do not serve for the conditioning of the injection mold assembly; they comprise, for example, electric conductors for sensors or lines to sense certain operational magnitudes and/or hydraulic line terminals for moving cores or slides or for driving unscrewing units.

In the embodiment illustrated in FIGS. 1–6, during conditioning, both mold halves 40' and 40" of the injection mold assembly may be supplied from a sole machine-side coupling half 31 and an associated sole mold-side coupling half 30. In the embodiment according to FIGS. 7 and 8, with each mold half 40', 40" of the injection mold assembly there is associated a machine-side coupling half 31' and a mold-side coupling half 30', and thus, accordingly, two holding elements 63b are provided. In case of injection mold assemblies S of unlike length, the coupling half 30' is secured to the back plate 41 in such a manner that its line terminal couplings 32 are flush in the vertical direction with the line terminal couplings 32' whose position is constant.

During automatic mold exchange, the injection mold assembly and the associated mold changing device cooperate functionally in a manner as will be now described. In FIGS. 2 and 7 there is shown the coupled state of the injection mold assembly in the working position in the clamping space of the mold closing unit, that is, during the injection molding process. The injection mold assembly S is supplied by means of the coupling halves 30, 31 and 30', 31' as well as the connecting bodies 36, 38.

Figure 11:
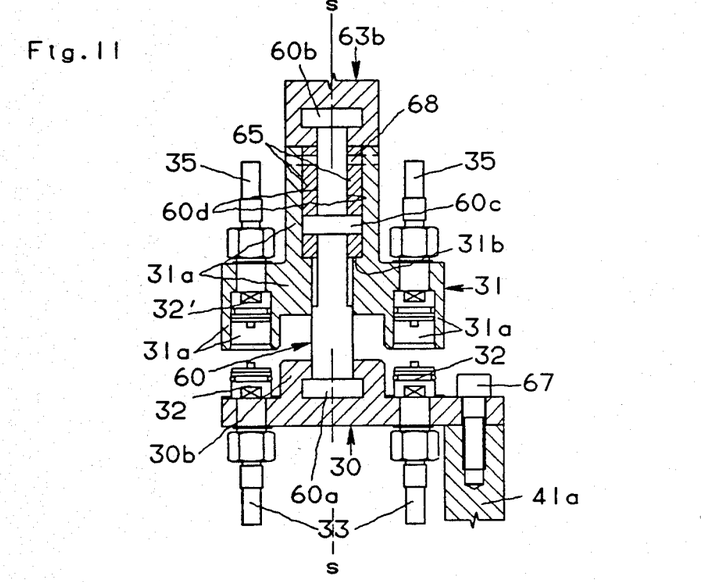
FIGS. 11 and 12 are sectional views taken, respectively, along line XI—XI of FIG. 9 and line XII—XII of FIG. 10.
Figure 12:
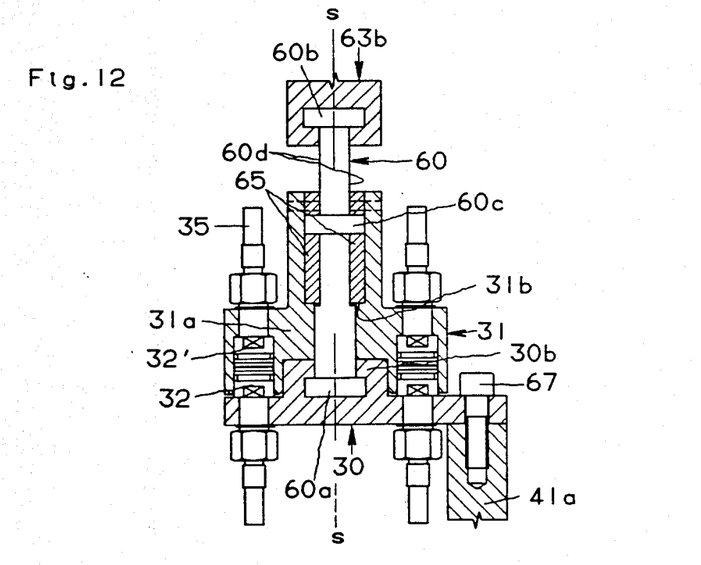

The injection mold assembly S to be exchanged is, after releasing the tightening bolts 15, conveyed out of the clamping space onto the conditioning table 19. During such a conveying motion the connecting bodies 36 and 38 are separated from one another. In the last phase of this conveying motion, the coupling heads 60b of the coupling pins 60 of the machine-side coupling halves 31 or 31' move into the T-groove 63c of the holding element 63a of the bridge 63 of the conditioning table 19. In this manner a position illustrated in FIGS. 6, 10 and 12 is obtained. Thereafter, by virtue of a stroke of the piston-and-cylinder unit 34 triggered by a computer of the injection molding machine or by a travelling component, the coupling heads 31, 30 or 31', 30' are disconnected from one another. In this manner a position is obtained which is illustrated in FIGS. 5, 9 and 11. In this position the machine-side coupling half 31, 31' is centered on the holding element 63b with the aid of the centering pin 62.

During the course of a further horizontal conveying motion oriented perpendicularly to the closing direction of the form closing unit, the injection mold assembly S is displaced with its mold-side coupling half 30 or, respectively, 30' onto a conveyor table (not shown) and is moved thereby into mold storage. The machine-side coupling half 31 or, respectively, 31' remain at the holding element 63b of the conditioning table 19. The injection mold assembly to be newly installed arrives in an opposite conveying path from the injection mold storage by means of the conveyor table and the conditioning table 19 into its working position in the clamping space. During the conveying motion of the injection mold assembly from the conveyor table onto the conditioning table 19, the T-groove 63c of the mold-side coupling half 30 or 30' is moved over the lower coupling heads 30a of the machine-side coupling half 31 or 31' which is suspended from the holding element 63b. These occurrences result in a position shown in FIGS. 5, 10 and 12. By virtue of a coupling stroke the coupling halves 30, 31 and, respectively, 30', 31' are brought into mutual engagement, that is, into a position which is shown in FIGS. 6, 10 and 12 in which the injection mold assembly is connected to all supply conduits necessary for conditioning. Thereafter, the injection mold assembly is conditioned which requires a more or less extended time period. It is noted in this connection that the conditioning is performed generally at a time while the injection mold assembly to be replaced is still in the clamping space, performing an injection molding operation. Such a time saving proceeding is possible because the conditioning table 19 is provided with two emplacements and is displaceable in the closing direction of the mold closing unit. Thus, the injection mold assembly to be exchanged may arrive from the second emplacement of the conditioning table 19 onto the conveyor table (as already described above) while a new injection mold assembly is being conditioned on the first emplacement.

Upon completion of the conditioning, the injection mold assembly is, with both coupling halves 30, 31 and, respectively, 30', 31' moved into the working position in the clamping space while, at the same time, the coupling heads 60b of the machine-side coupling halves 31 or 31' are moved out of the T-groove 63 of the holding element 63c. In the last phase of the entering motion into the clamping space the coupling bodies 36, 38 arrive into mutual engagement. This connects the supply lines 39 which do not serve for the conditioning process but are required exclusively for the injection molding process proper, to the injection mold assembly.

It is further noted that a defect (breakdown) of the coupling drive, particularly the hydraulic driving force of the piston-and-cylinder unit 34 cannot result in a release of the mutual engagement between the coupling halves 31, 30 and, respectively, 31', 30' because the identical cam tracks 65a in the control strips 65 each have an upper terminal portion of such a small upward slope that in the coupled position (FIG. 10) a self-wedging of the control pins 60c in the associated cam tracks 65a is ensured. The greater disconnecting force for the release of the coupling required by this arrangement is ensured by so designing the piston 34b of the piston-and-cylinder unit 34 that its effective piston face associated with the release (disconnecting) stroke is larger than that associated with the coupling stroke.

The described mold closing unit is disclosed in further detail in a U.S. patent application Ser. No. 06/839,173 filed Mar. 13, 1986.

It will be understood that the above description of the present invention is susceptible to various modifications, changes and adaptations, and the same are intended to be comprehended within the meaning and range of equivalents of the appended claims.

What is claimed is:

1. In a mold closing unit for an injection molding machine, including an exchangeable injection mold assembly having a mold body bounded on opposite sides thereof by back plates secured thereto; means defining a clamping space where said mold body is clamped in a working position thereof; a conditioning table situated adjacent said clamping space; said injection mold assembly being movable to and onto said conditioning table from a location outside said mold closing unit or from said clamping space of said mold closing unit; said injection mold assembly being movable from said conditioning table to said clamping space or to said location outside said mold closing unit; supply line coupling, means for operatively connecting to and disconnecting from one another conduit terminals of mold-side supply conduits forming a permanent part of said injection mold assembly and machine-side supply conduits forming a permanent part of said injection molding machine externally of said injection mold assembly; said supply line coupling means being formed of a mold-side coupling half containing terminals of said mold-side supply conduits and being fixedly attached to said mold body, and a machine-side coupling half containing terminals of said machine-side supply conduits and being arranged to be movable between said conditioning table and said clamping space; said mold-side coupling half and said machine-side coupling half being joinable to and disconnectable from, one another along a horizontal parting plane of said supply line coupling means for coupling the machine-side and mold-side conduits to one another for preheating said injection mold assembly on said conditioning table; said injection mold assembly being movable from said conditioning table into said working position in said clamping space horizontally and perpendicularly to a closing direction of said mold losing unit without disconnection of said supply line coupling means; the improvement wherein said machine-side coupling half is situated above the conditioning table; further where in the improvement comprises
   (a) a coupling drive means mounted on said machine-side coupling half for performing coupling and uncoupling strokes;
   (b) force-transmitting connecting means connecting said coupling drive means with said machine-side coupling half for effecting coupling and uncoupling motions, respectively, of said machine-side coupling half during respective coupling and uncoupling strokes of said coupling drive means;
   (c) vertically oriented coupling pins being connected at least indirectly to said coupling drive means and being further arranged to guide said machine-side coupling half during said coupling and uncoupling motions thereof; each said coupling pin having opposite first and second ends;
   (d) a holding element mounted on said conditioning table; and
   (e) first, second, third and fourth inter-engagement means; said first and second interengagement means forming part of said first and second ends, respectively, of each said coupling pin; said third and fourth engagement means forming part of said holding element and said mold-side coupling half, respectively; said first and third engagement means being arranged for entering into an interengaging position with one another and said second and fourth engagement means being arranged for entering into an interengaging position with one another dependent upon a conveying motion of said mold assembly; in said interengaging position said coupling drive means and said machine-side coupling half being supported for executing the coupling stroke to move said machine-side coupling half into an operative engagement with said mold-side coupling half by said coupling stroke of said coupling drive means.

2. A mold closing unit as defined in claim 1, wherein said mold-side and said machine-side coupling halves have complementally configured, interfitting positive and negative body portions.

3. A mold closing unit as defined in claim 1, wherein in a coupled state of said supply line coupling means the interconnected coupling halves are situated on an upper edge of one of said back plates; said mold body of said injection mold assembly having a rear side and said one back plate has an outer surface; said supply line coupling means being flush with said rear side and said outer surface.

4. A mold closing unit as defined in claim 1, wherein said machine-side and mold-side coupling halves have mutually cooperating sensor terminals, electric terminals and codings.

5. A mold closing unit as defined in claim 1, further comprising a first coupling body affixed to one of said back plates at a distance from said mold-side coupling half; said first coupling body containing terminals of lines forming part of said injection mold assembly; and a second coupling body being stationarily supported externally of said injection mold assembly; said second coupling body containing terminals of machine-side lines; the terminals contained in said first coupling body and the terminals contained in said second coupling body being arranged for cooperating with one another.

6. A mold closing unit as defined in claim 1, wherein said supply line coupling means in a coupled state supplies all fluid required for a preheating of said injection mold assembly on said conditioning table; said injection mold assembly having a first mold body half carrying said mold-side coupling half and a second mold body half movable with respect to said first mold body half; said second mold body half having flexible conduits attached to an outer face thereof; said flexible conduits being connected with said mold-side coupling half.

7. A mold closing unit as defined in claim 1, wherein said injection mold assembly has first and second mold halves; said supply line coupling means comprises first and second mold-side coupling halves and first and second machine-side coupling halves; said conditioning table having a horizontal carrier beam equipped with first and second holding elements; said first and second mold-side coupling halves being secured to said first and second mold halves, respectively, and said first and second machine-side coupling halves being mounted on said first and second holding elements, respectively.

8. A mold closing unit as defined in claim 1, further wherein said coupling pins project beyond opposite sides of said machine-side coupling half; further wherein said first and second interengagement means comprise upper and lower coupling heads carried by each said coupling pin on opposite respective upper and lower ends thereof; said third interengagement means defining a T-groove in said holding element of said conditioning table; and said fourth interengagement means defining a T-groove in said mold-side coupling half; during conveying motion of said injection mold assembly, the upper coupling heads being engageable with said T-groove in said holding element and the lower coupling heads being engageable with said T-groove of said mold-side coupling half.

9. A mold closing unit as defined in claim 8, wherein said coupling pins and said T-grooves of said holding element and said mold-side coupling half are arranged symmetrically to a common vertical symmetry plane of said machine-side and mold-side coupling halves.

10. A mold closing unit as defined in claim 8, further comprising a bridge forming part of said conditioning table and a horizontal carrying beam forming part of said bridge; said holding element being affixed to said horizontal carrying beam.

11. A mold closing unit as defined in claim 8, further comprising a rib forming part of said mold-side coupling half; said T-groove of said mold-side coupling half being formed in said rib; said rib being flanked on either side by the terminals of said mold-side supply conduits.

12. A mold closing unit as defined in claim 1, wherein said coupling drive means comprises a hydraulic piston-and-cylinder unit arranged to perform horizontal strokes; further wherein said force-transmitting connecting means comprises cam control means for converting horizontal strokes of said coupling drive means into vertical motions of said machine-side coupling half.

13. A mold closing unit as defined in claim 12, wherein said piston-and-cylinder unit is arranged for executing coupling strokes in one direction and uncoupling strokes in an opposite direction; said piston-and-cylinder unit comprises a piston having opposite working faces exposed to opposite hydraulic forces for effecting said coupling and uncoupling strokes, respectively; the working face exposed to hydraulic forces for effecting the coupling strokes has a smaller area than that of the working face exposed to hydraulic forces for effecting the uncoupling strokes.

14. A mold closing unit as defined in claim 12, wherein said hydraulic piston-and-cylinder unit comprises a piston rod attached to the piston of said hydraulic piston-and-cylinder unit; further wherein said piston rod comprises control strips attached to said piston rod for displacement therewith; said control strips being provided with cam tracks; said coupling pins having follower pins projecting from respective said coupling pins into said cam tracks, said cam tracks and said follower pins forming part of said force-transmitting connecting means.

15. A mold closing unit as defined in claim 14, wherein said coupling pins are uniformly spaced from one another along a conveying path of said injection mold assembly; said coupling pins having diametrically opposite flattened portions; said control strips flanking said coupling pins on either side thereof and being guided on said flattened portions during their displacement; said control strips having horizontal slots therein; said machine-side coupling half having guide pins projecting into said horizontal slots of said control strips.

16. A mold closing unit as defined in claim 14, wherein said cam tracks have an upper end portion of a small slope designed for causing, in a coupled state of said supply line coupling means, a self-locking of a respective said follower pin in the cam track.

* * * * *